(12) United States Patent
Ni et al.

(10) Patent No.: US 12,099,288 B2
(45) Date of Patent: Sep. 24, 2024

(54) LENS MODULE

(71) Applicant: Changzhou AAC Raytech Optronics Co., Ltd., Changzhou (CN)

(72) Inventors: Tianheng Ni, Shenzhen (CN); Feng Yan, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 529 days.

(21) Appl. No.: 17/536,113

(22) Filed: Nov. 29, 2021

(65) Prior Publication Data

US 2022/0206362 A1    Jun. 30, 2022

(30) Foreign Application Priority Data

Dec. 30, 2020   (CN) .......................... 202023256063.3

(51) Int. Cl.
  *G03B 5/00*   (2021.01)
  *G01D 5/14*   (2006.01)
  *H04N 23/51*  (2023.01)

(52) U.S. Cl.
  CPC .............. *G03B 5/00* (2013.01); *G01D 5/142* (2013.01); *H04N 23/51* (2023.01); *G03B 2205/0076* (2013.01)

(58) Field of Classification Search
  CPC .............................................. G03B 2205/0076
  See application file for complete search history.

(56) References Cited

U.S. PATENT DOCUMENTS

| | | | |
|---|---|---|---|
| 2013/0002933 A1* | 1/2013 | Topliss | H04N 23/687 |
| | | | 310/306 |
| 2021/0294068 A1* | 9/2021 | Que | F03G 7/0636 |

\* cited by examiner

*Primary Examiner* — Noam Reisner
(74) *Attorney, Agent, or Firm* — W&G Law Group

(57) ABSTRACT

A lens module includes a base, a lens assembly, a bearing member including fixing and rotating frames, a shape memory alloy wire assembly including first and second shape memory alloy (SMA) wires, and at least one first and second wire-binding clamp members. The first SMA wires drive rotating frame to rotate relative to base about a first direction, and the second SMA wires drive the fixing frame to rotate relative to the rotating frame about a second direction. The first and second directions are perpendicular to each other and perpendicular to optical axis of the lens assembly. The rotating frame includes first and second rotating side plates. Each first wire-binding clamp member is connected to two first SMA wires, and each second wire-binding clamp member is connected to two second SMA wire. The lens module has low cost and occupies a small space, and the magnetic interference can be avoided.

18 Claims, 10 Drawing Sheets

LENS MODULE

TECHNICAL FIELD

The present disclosure relates to the technical field of lens optical imaging, and in particular, to a lens module.

BACKGROUND

In recent years, portable terminal machines such as smart phones and tablet computers have been equipped with high-performance lens modules. The high-performance lens modules generally have an optical image stabilization (OIS) function.

The lens module in the related art uses a voice coil motor (VCM) to drive the lens assembly so that the lens assembly can achieve the auto-focusing function or shake correction function. However, such structure requires an additional Hall sensor to obtain the position information of the lens assembly, which is expensive and cannot avoid the magnetic interference. In addition, the lens module with the VCM has a larger volume so that it is difficult to reduce the height. Accordingly, it is difficult to achieve the miniaturization of the lens module.

Therefore, it is necessary to provide a lens module to solve the above problems.

SUMMARY

The purpose of the present disclosure is to provide a lens module, which can solve the technical problems of high cost, magnetic interference, and being difficult in miniaturization of the lens module in the related art.

The present disclosure provides a lens module that includes a base, a bearing member rotatably connected to the base, a lens assembly accommodated in the bearing member, and a shape memory alloy wire assembly configured to drive the bearing member to move relative to the base. The bearing member includes a fixing frame and a rotating frame sleeved on the fixing frame. The shape memory alloy wire assembly includes first shape memory alloy wires connected between the rotating frame and the base, and second shape memory alloy wires connected between the fixing frame and the base. The first shape memory alloy wires are configured to drive the rotating frame to rotate relative to the base about a first direction, and the second shape memory alloy wires are configured to drive the fixing frame to rotate relative to the rotating frame about a second direction perpendicular to the first direction. Both the first direction and the second direction are perpendicular to an optical axis of the lens assembly. The rotating frame includes first rotating side plates opposite to and spaced apart from each other, and second rotating side plates connected to the first rotating side plates and opposite to and spaced apart from each other. The lens module further includes at least one first wire-binding clamp member fixed to the first rotating side plates, and at least one second wire-binding clamp member fixed to a side of the fixing frame close to the second rotating side plates. Each of the at least one first wire-binding clamp member is connected to two first shape memory alloy wires of the first shape memory alloy wires respectively located at two sides of each of the second rotating side plates, and the two first shape memory alloy wires are configured to drive the rotating frame to rotate about the first direction when the two first shape memory alloy wires are energized. Each of the at least one second wire-binding clamp member is connected to two second shape memory alloy wires of the second shape memory alloy wires respectively located at two sides of each of the first rotating side plates, and the two second shape memory alloy wires are configured to drive the fixing frame to rotate about the second direction when the two second shape memory alloy wires are energized.

As an improvement, the rotating frame has a rectangular structure, the first direction is parallel to a direction of a line connecting middle portions of two opposite second rotating side plates of the second rotating side plates, and the second direction is parallel to a direction of a line connecting middle portions of two opposite first rotating side plates of the first rotating side plates.

As an improvement, each of the at least one first wire-binding clamp member includes two first wire-binding clamps and a first conductive sheet electrically connecting the two first wire-binding clamps, where each of the two first wire-binding clamps is electrically connected to one of the two first shape memory alloy wires that is located at a side of one of the second rotating side plates.

As an improvement, each of the at least one second wire-binding clamp member includes two second wire-binding clamps and a second conductive sheet electrically connecting the two second wire-binding clamps, where each of the two second wire-binding clamps is electrically connected to one of the two second shape memory alloy wires that is located at a side of one of the first rotating side plates.

As an improvement, the first conductive sheet is embedded in one of the first rotating side plates, and/or the second conductive sheet is embedded in the fixing frame.

As an improvement, the fixing frame includes first fixing side plates opposite to each other, and second fixing side plates configured to connect the first fixing side plates and opposite to and spaced apart from each other. One first fixing side plate of the first fixing side plates directly faces towards and is spaced apart from one of the first rotating side plates, and one of the second fixing side plates directly faces towards and is spaced apart from one of the second rotating side plates. The two first wire-binding clamps of one of the at least one first wire-binding clamp member are respectively disposed at connecting portions where one first rotating side plate of the first rotating side plates is connected to two of the second rotating side plates adjacent to the one first rotating side plate. The two second wire-binding clamps of one of the at least one second wire-binding clamp member are respectively disposed at connecting portions where one of the second fixing side plates are connected to two of the first fixing side plates.

As an improvement, the at least one first wire-binding clamp member includes two first wire-binding clamp members, the at least one second wire-binding clamp member includes two second wire-binding clamp members, each of the first rotating side plates is provided with one of the two first wire-binding clamps, and each of the second fixing side plates is provided with one of the two second wire-binding clamps. Two first conductive connecting portions are provided on portions of the base close to each of the first rotating side plates, respectively, and two second conductive connecting portions are provided on portions of the base close to each of the second rotating side plates, respectively. Each of the first shape memory alloy wires is electrically connected to one of the two second conductive connecting portions and one of the two first wire-binding clamps, and each of the second shape memory alloy wires is electrically connected to one of the two first conductive connecting portions and one of the two second wire-binding clamps.

As an improvement, two of the second shape memory alloy wires disposed at a same side of one of the first rotating side plates cross each other, and two of the first shape memory alloy wires disposed at a same side of one of the second rotating side plates cross each other.

As an improvement, a first connecting member is provided between the fixing frame and each of the first rotating side plates, and the fixing frame is mounted to the rotating frame through the first connecting member and is rotatable relative to the rotating frame about the second direction. A second connecting member is provided between the base and each of the second rotating side plates, and the rotating frame is mounted to the base through the second connecting member and is rotatable relative to the base about the first direction.

As an improvement, the fixing frame further includes fixing frame extending portions, each of which extends from one of the first fixing side plates towards one of the first rotating side plates. The first connecting member is provided between one of the fixing frame extending portions and one of the first rotating side plates. The base includes a base plate and base extending portions respectively extending from sides of the base plate corresponding to the second rotating side plates towards the second rotating side plates, and the second connecting member is disposed between one of the base extending portions and one of the second rotating side plates.

As an improvement, the first connecting member includes at least two first rolling balls, where at least one of the at least two first rolling balls is provided between each of the first rotating side plates and one of the fixing frame extending portions. The second connecting member includes at least two second rolling balls, where at least one of the at least two second rolling balls is provided between each of the second rotating side plates and one of the base extending portions.

As an improvement, each of the at least two first rolling ball is disposed at a middle of one of the first rotating side plates, and each of the at least two second rolling balls is disposed at a middle of one of the second rotating side plates.

As an improvement, each of the first rotating side plates is provided with a clamping portion that is recessed from a side of the first rotating side plate close to one fixing frame extending portion of the fixing frame extending portions towards a direction away from the fixing frame extending portion, the first connecting member is accommodated in the clamping portion, and the one fixing frame extending portion is fitted to the clamping portion through the first connecting member.

As an improvement, the clamping portion is recessed away from the one fixing frame extending portion to form a first recess, and a side of the one fixing frame extending portion close to the rotating frame is recessed away from the rotating frame to form a second recess; and the first recess and the second recess are oppositely fitted to each other to form a first receiving space where the first connecting member is accommodated.

As an improvement, a side of one of the second rotating side plates close to one base extending portion of the base extending portions is recessed away from the one base extending portion to form a third recess, and a side of the one base extending portion close to one second rotating side plate of the second rotating side plates is recessed away from the one second rotating side plate to form a fourth recess; and the third recess and the fourth recess are oppositely fitted to form a second receiving space where the second connecting member is accommodated.

In the lens module of the present disclosure, the shape memory alloy wires are applied to the optical image stabilization driving assembly so that the position information of the lens assembly can be obtained through the resistance of the shape memory alloy wires. Accordingly, it is unnecessary to additionally provide a Hall sensor to obtain the position information of the lens assembly. Compared with the Hall sensor, the shape memory alloy wires have low cost and occupy a small space, and the magnetic interference can be avoided. Therefore, the lens assembly of the present disclosure has low cost and occupies a small space, and the magnetic interference can be avoided.

DESCRIPTION OF REFERENCE NUMERALS

100. lens module;
1. base; 11. base plate; 12. base extending portion; 121. fourth recess;
2. bearing member; 21. fixing frame; 211. first fixing side plate; 212. second fixing side plate; 213. fixing frame extending portion; 2131. second recess; 22. rotating frame; 221. first rotating side plate; 2211. clamping portion; 2212. first recess; 222. second rotating side plate; 2221. third recess;
3. lens assembly;
4. shape memory alloy wire assembly; 41. first shape memory alloy wire; 42. second shape memory alloy wire;
51. first wire-binding clamp member; 511. first wire-binding clamp; 512. first conductive sheet; 52. second wire-binding clamp member; 521. second wire-binding clamp;

522. second conductive sheet;
61. first conductive connecting portion; 62. second conductive connecting portion; 71. first connecting member; 711. first rolling ball; 72. second connecting member; 721. second rolling ball;
8. circuit board;
9. shell; 91. upper housing; 92. lower housing;
X. first direction; Y second direction.

DESCRIPTION OF EMBODIMENTS

The following describes the present disclosure in detail with reference to FIGS. 1 to 12.

Figure 1:
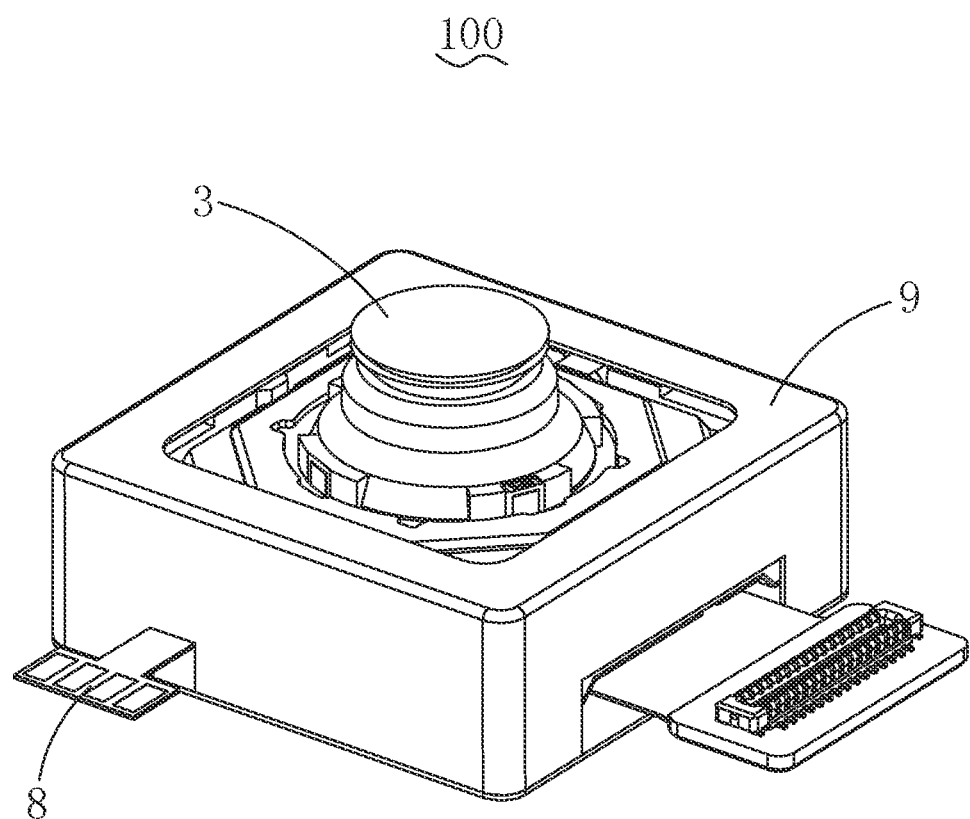
FIG. 1 is a schematic structural diagram of a lens module according to an embodiment of the present disclosure.
Figure 2:
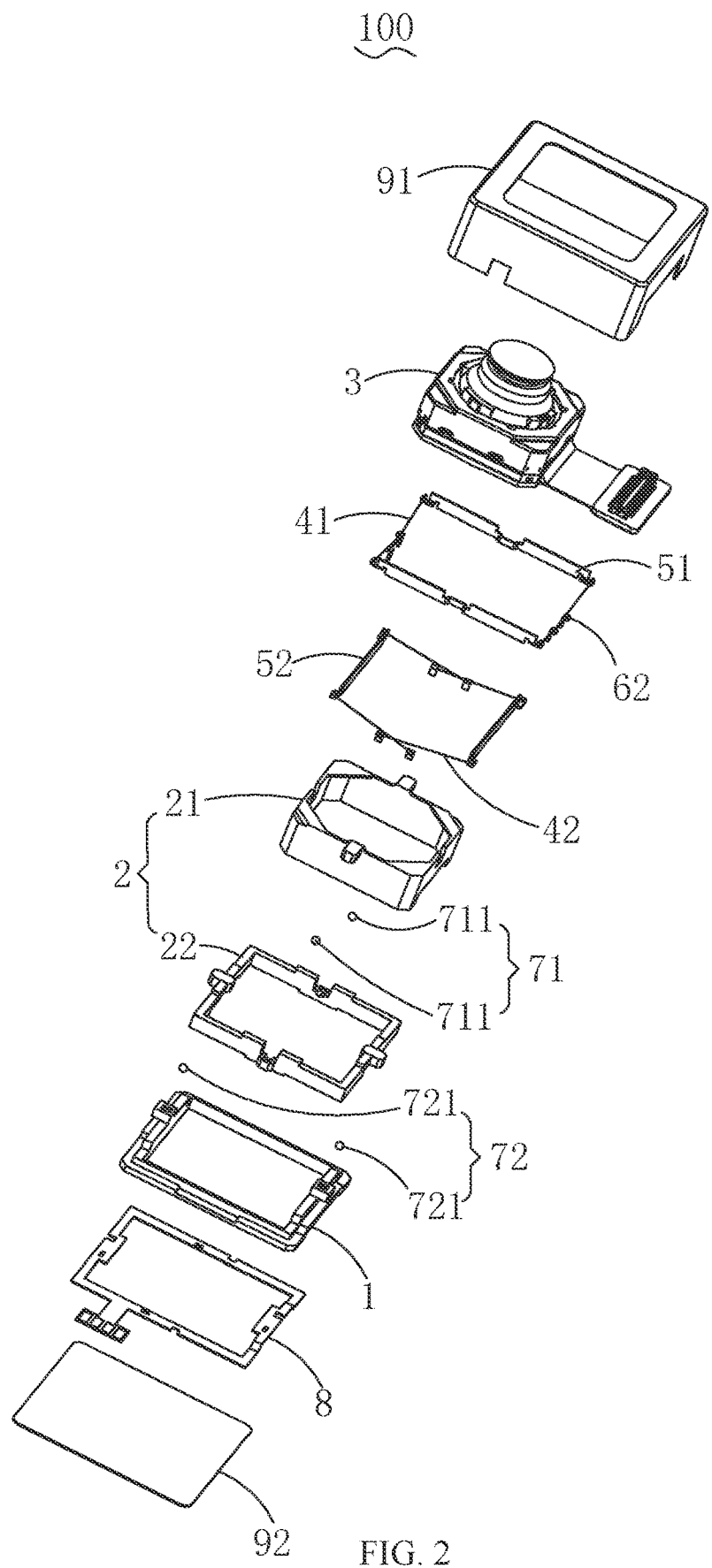
FIG. 2 is an exploded view of the lens module according to the embodiment of the present disclosure.
Figure 3:
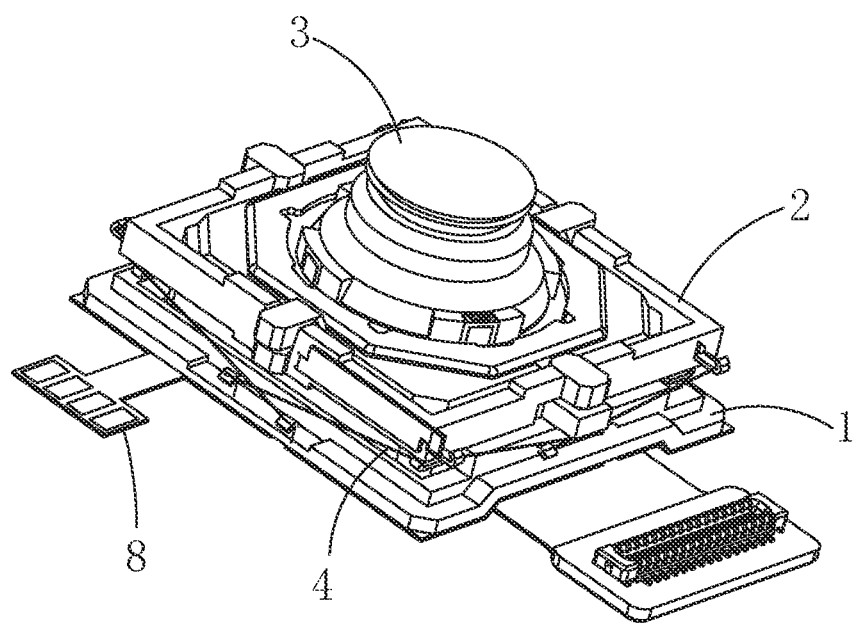
FIG. 3 is a schematic structural diagram of a lens module according to an embodiment of the present disclosure, in which a shell is removed.

Referring to FIG. 1 to FIG. 3, an embodiment of the present disclosure provides a lens module 100. The lens module 100 includes a base 1, a bearing member rotatably connected to the base 1, a lens assembly 3 accommodated in the bearing member 2, and a shape memory alloy wire assembly 4 configured to drive the bearing member 2 to move relative to the base 1. The shape memory alloy wire assembly 4 includes multiple shape memory alloy wires. In the embodiment, the shape memory alloy wires are used to obtain the position information of the lens assembly 3 in the bearing member 2. That is, the position information of the lens assembly 3 is obtained by means of resistances of the shape memory alloy wires to achieve the acquisition of the position information of the lens assembly 3. Accordingly, it is unnecessary to additionally provide a Hall sensor to obtain the position information of the lens assembly 3. Compared with the Hall sensor, the cost of the shape memory alloy wires is low, the shape memory alloy wires occupy a smaller space, and the magnetic interference of the Hall sensor can be avoided. Therefore, the lens module 100 of the present disclosure has low cost, has no magnetic interference problem, and occupy a small space.

Figure 4:
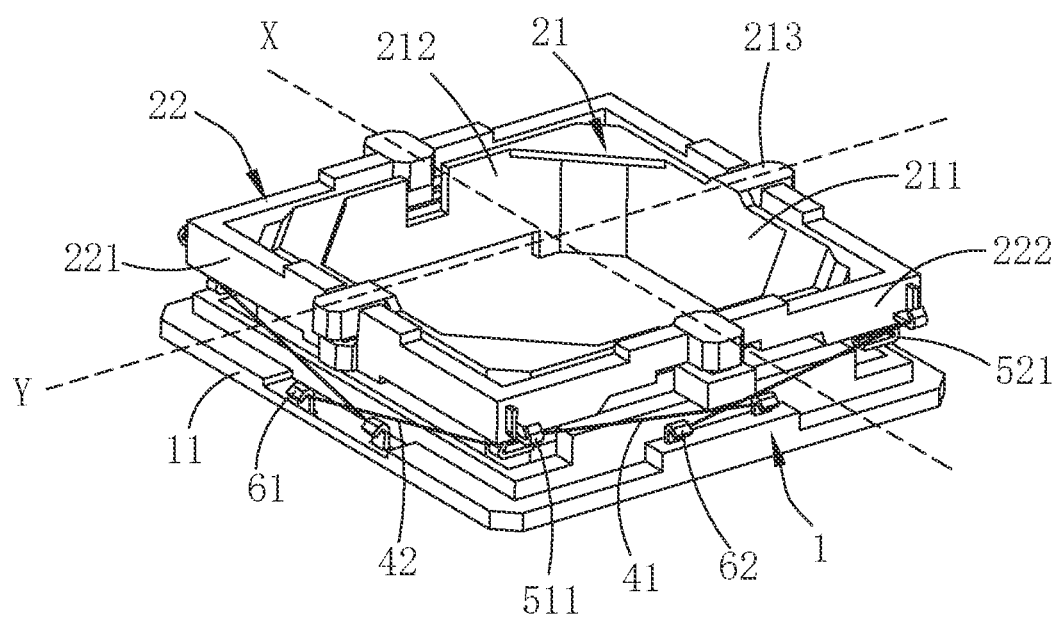
FIG. 4 is a schematic structure diagram of a base, a bearing member and shape memory alloy wires, which are assembled, according to an embodiment of the present disclosure.

Referring to FIG. 3 and FIG. 4, the bearing member 2 includes a fixing frame 21 and a rotating frame 22 sleeved on the fixing frame 21. The shape memory alloy wire assembly 4 includes first shape memory alloy wires 41 connected between the rotating frame 22 and the base 1, and second shape memory alloy wires 42 connected between the fixing frame 21 and the base 1. The first shape memory alloy wires 41 are configured to drive the rotating frame 22 to rotate relative to the base 1 about a first direction X, and the second shape memory alloy wires 42 are configured to drive the fixing frame 21 to rotate relative to the rotating frame 22 about a second direction Y perpendicular to the first direction X. The first direction X and the second direction Y are both perpendicular to an optical axis of the lens assembly 3. In an embodiment, the lens assembly 3 is accommodated in the fixing frame 21. When the first shape memory alloy wires 41 drive the rotating frame 22 to rotate relative to the base 1 about the first direction X and simultaneously drive the fixing frame 21 located in the rotating frame 22 to also rotate relative to the base 1 about the first direction X, the lens assembly 3 accommodated in the fixing frame 21 is then driven to rotate relative to the base 1 about the first direction X to achieve the anti-shake correction of the lens assembly 3. The second shape memory alloy wires 42 drive the fixing frame 21 to rotate relative to the rotating frame 22 about the second direction Y and simultaneously drive the lens assembly 3 accommodated in the fixing frame 21 to rotate relative to the rotating frame 22 about the second direction Y, thereby achieving the anti-shake correction of lens assembly 3. The first direction X and the second direction Y are perpendicular to each other and are different directions. The first shape memory alloy wires 41 for driving the rotating frame 22 to rotate relative to the base 1 about the first direction X are connected between the rotating frame 22 and the base 1, and the second shape memory alloy wires 42 for driving the fixing frame 21 to rotate relative to the rotating frame 22 about the second direction Y is connected between the fixing frame 21 and the base 1. The first shape memory alloy wires 41 and the second shape memory alloy wires 42 have different driving directions and are connected between different components, to ensure that the first shape memory alloy wires 41 and the second shape memory alloy wires 42 are not interfered with each other and the stress of the first shape memory alloy wires 41 and the stress of the second shape memory alloy wires 42 are both reduced.

Figure 5:
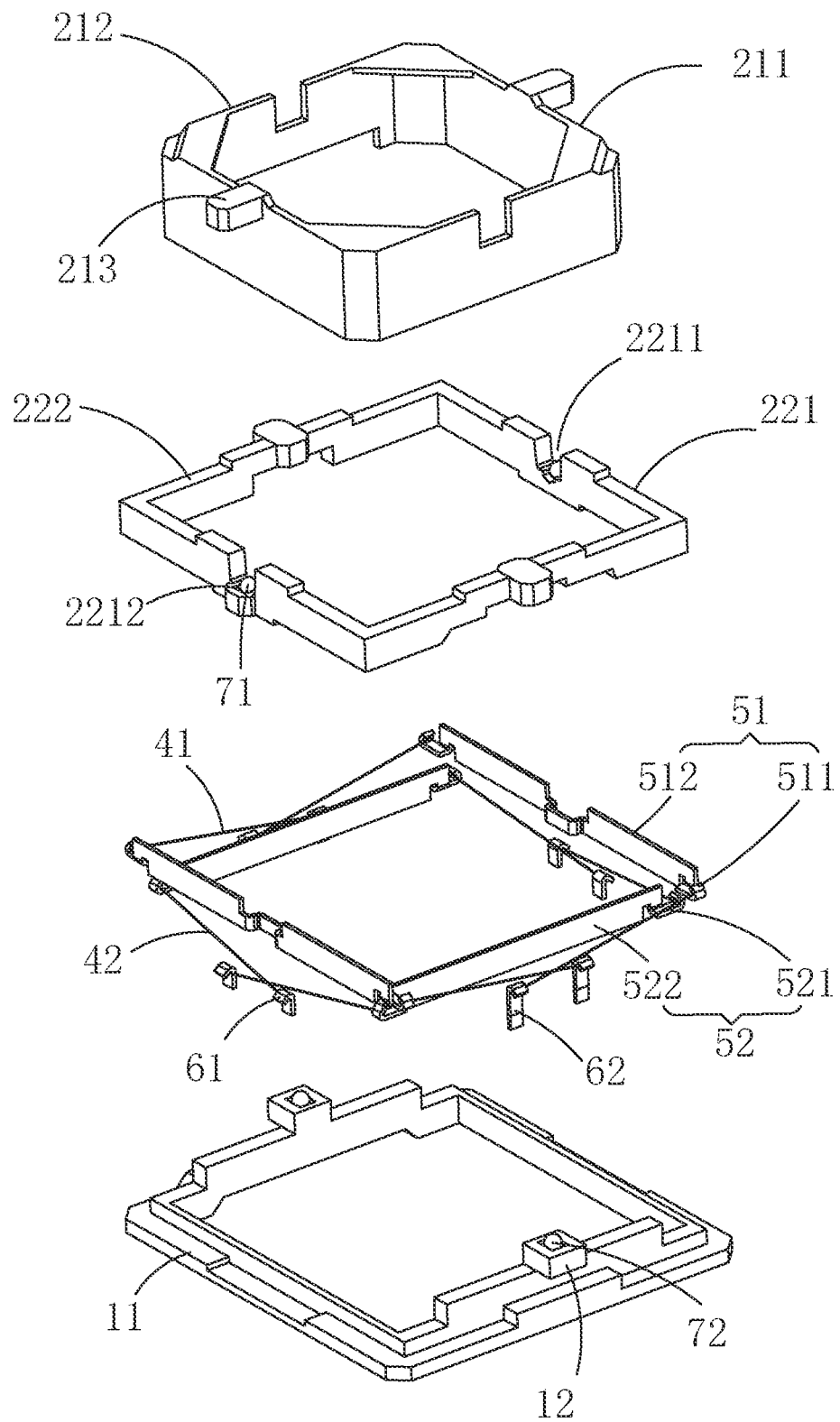
FIG. 5 is a schematic diagram showing an exploded structure of FIG. 4.
Figure 6:
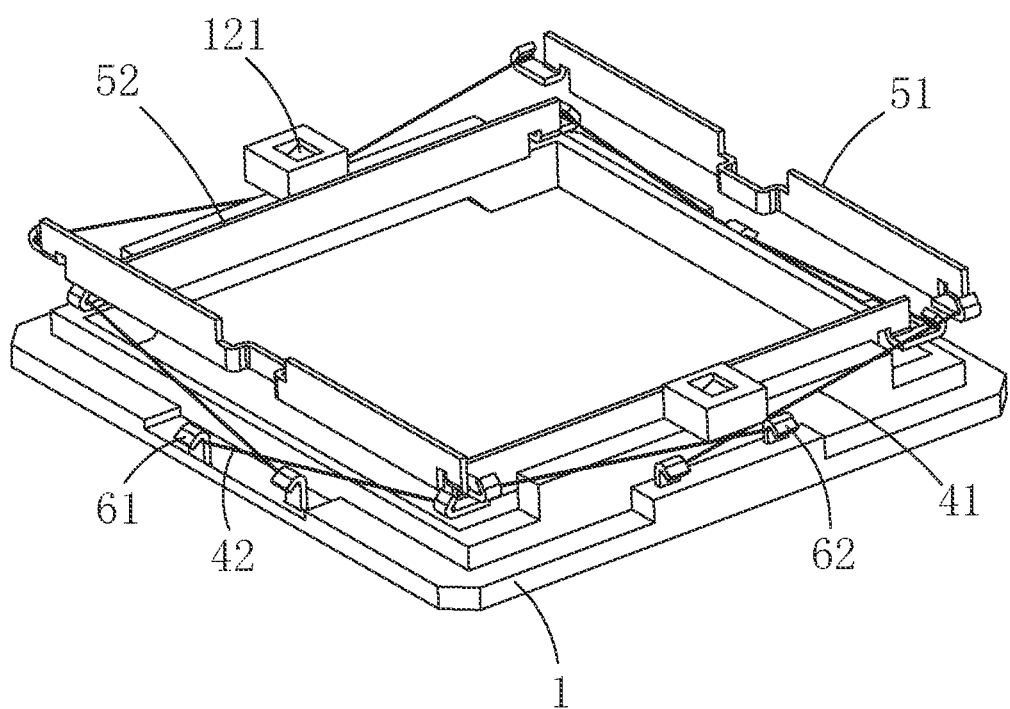
FIG. 6 is a structural diagram showing a connection mode of the shape memory alloy wires of the present disclosure.
Figure 7:
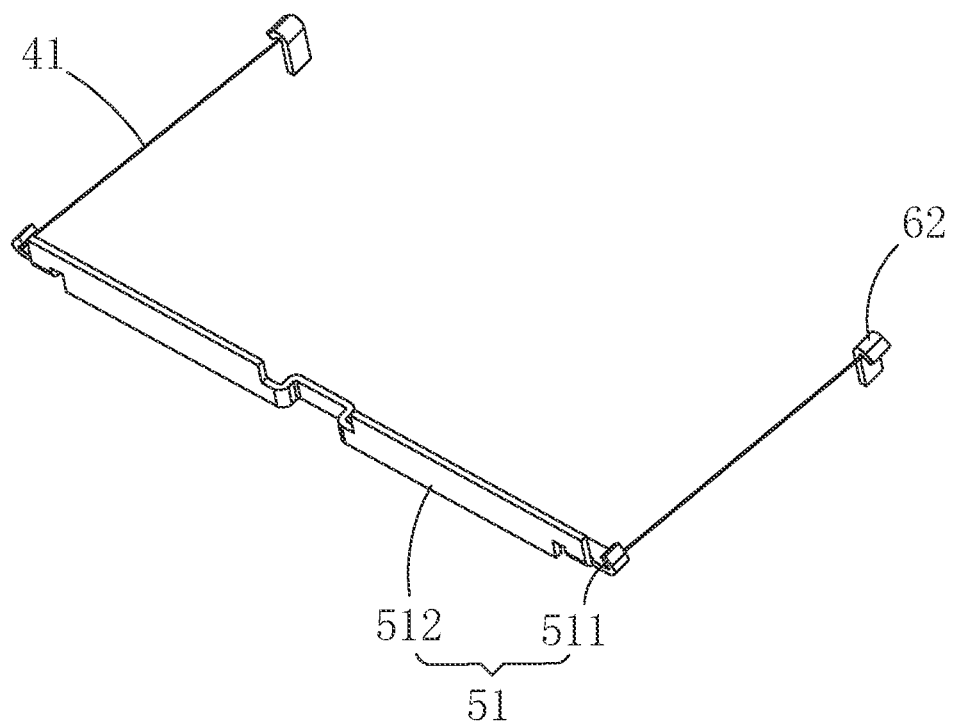
FIG. 7 is a schematic structural diagram of first shape memory alloy wires for connecting first wire-binding clamps and second conductive connecting portions according to an embodiment of the present disclosure.
Figure 8:
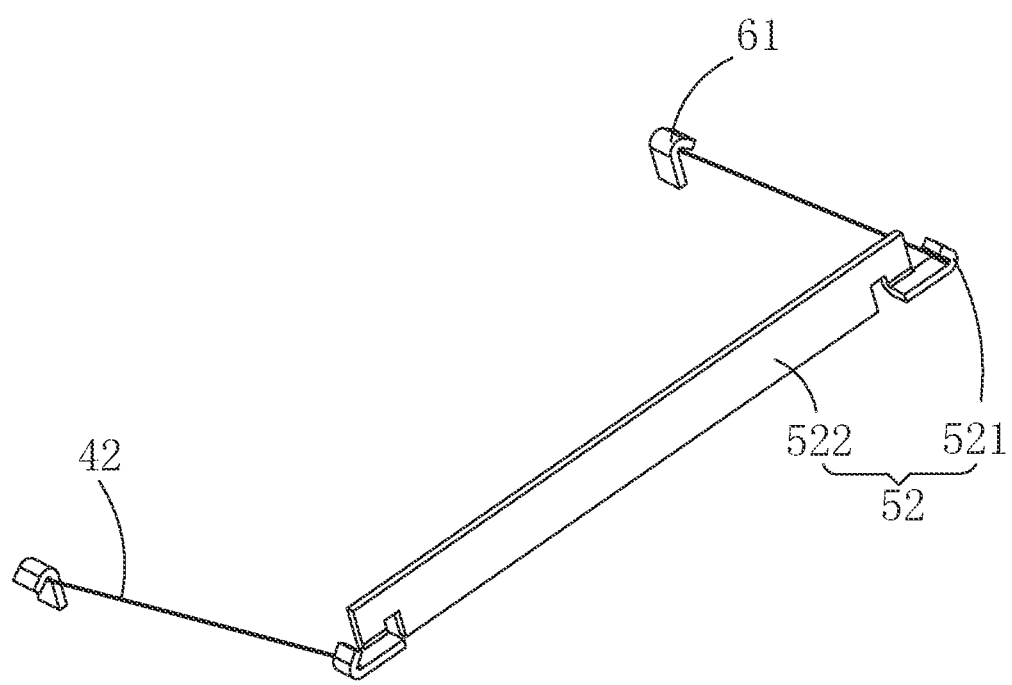
FIG. 8 is a schematic structural diagram of second shape memory alloy wires for connecting second wire-binding clamps and first conductive connecting portion according to an embodiment of the present disclosure.

Referring to FIG. 1, FIG. 4, and FIG. 5, the rotating frame 22 includes first rotating side plates 221 opposite to and spaced apart from each other and second rotating side plates 222 for connecting the first rotating side plates 221 and opposite to and spaced part from each other. The lens module 100 can further include at least one first wire-binding clamp member 51 fixed to the first rotating side plates 221 and at least one second wire-binding clamp member 52 fixed to a side of the fixing frame 21 close to the second rotating side plates 222. Each of the at least one first wire-binding clamp member 51 is connected to two of the first shape memory alloy wires 41 respectively located at both sides of the second rotating side plate 222. The two first shape memory alloy wires 41 connected to the same first wire-binding clamp member 51 are energized to drive the rotating frame 22 to rotate about the first direction X. Each of the at least one second wire-binding clamp member 52 is connected to two of the second shape memory alloy wires 42 located on both sides of the first rotating side plate 221. The two second shape memory alloy wires 42 connected to the same second wire-binding clamp member 52 are energized to drive the fixing frame 21 to rotate about the second direction Y. With this arrangement, the first shape memory alloy wires 41 and the second shape memory alloy wires 42 have different driving directions and are connected between different components. It can be understood that, in other embodiments, each of the at least one first wire-binding clamp member 51 may be connected to two of the second shape memory alloy wires 42 located on one side of the first rotating side plate 221, and each of the at least one second wire-binding clamp member 52 may be connected to two of the first shape memory alloy wires 41 located on one side of the second rotating side plate 222.

In an embodiment, the rotating frame 22 has a rectangular structure. The first direction X is parallel to a direction of a line connecting middle portions of two opposite second rotating side plates 222. The second direction Y is parallel to a direction of a line connecting middle portions of two opposite first rotating side plates 221. In other embodiments, the rotating frame 22 may have a circular structure, a pentagonal structure, or a hexagonal structure.

Referring to FIG. 4 to FIG. 7, each of the at least one first wire-binding clamp member 51 includes two first wire-binding clamps 511 and a first conductive sheet 512 for electrically connecting the two first wire-binding clamps 511. Each of the two first wire-binding clamps 511 is electrically connected to one of the first shape memory alloy wires 41 located at one side of the second rotating side plate 222. With such configuration, one first wire-binding clamp member 51 can electrically connect two first shape memory alloy wires 41, and the first conductive sheet 512 can provide electric power to the two first wire-binding clamps 511 of the first wire-binding clamp member 51. In this way, it can be prevented that the first shape memory alloy wires 41 is too long without the first conductive sheet 512, thereby improving the response speed of the first shape memory alloy wires 41.

Referring to FIG. 4 to FIG. 6 and FIG. 8, each of the at least one second wire-binding clamp member 52 includes two second wire-binding clamps 521 and a second conductive sheet 522 for electrically connecting the two second wire-binding clamps 521. Each of the second wire-binding clamps 521 is electrically connected to one of the second shape memory alloy wires 42 located at one side of the first rotating side plate 221. With such configuration, one second wire-binding clamp member 52 can be connected to two second shape memory alloy wires 42, and the second conductive sheet 522 can provide electric power to the two second wire-binding clamps 521 of the second wire-binding clamp member 52. Such configuration can prevent the second shape memory alloy wires 42 from being too long without the second conductive sheet 522, thereby improving the response speed of the second shape memory alloy wires 42.

In an embodiment, the first conductive sheet 512 is embedded in the first rotating side plate 221, and the second conductive sheet 522 is fixed to the fixing frame 21. In other embodiments, the first conductive sheet 512 can be fixed to the first rotating side plate 221, and the second conductive sheet 522 can be embedded in the fixing frame 21. In another embodiment, the first conductive sheet 512 can be embedded in the first rotating side plate 221, and the second conductive sheet 522 can be embedded in the fixing frame 21.

Figure 9:
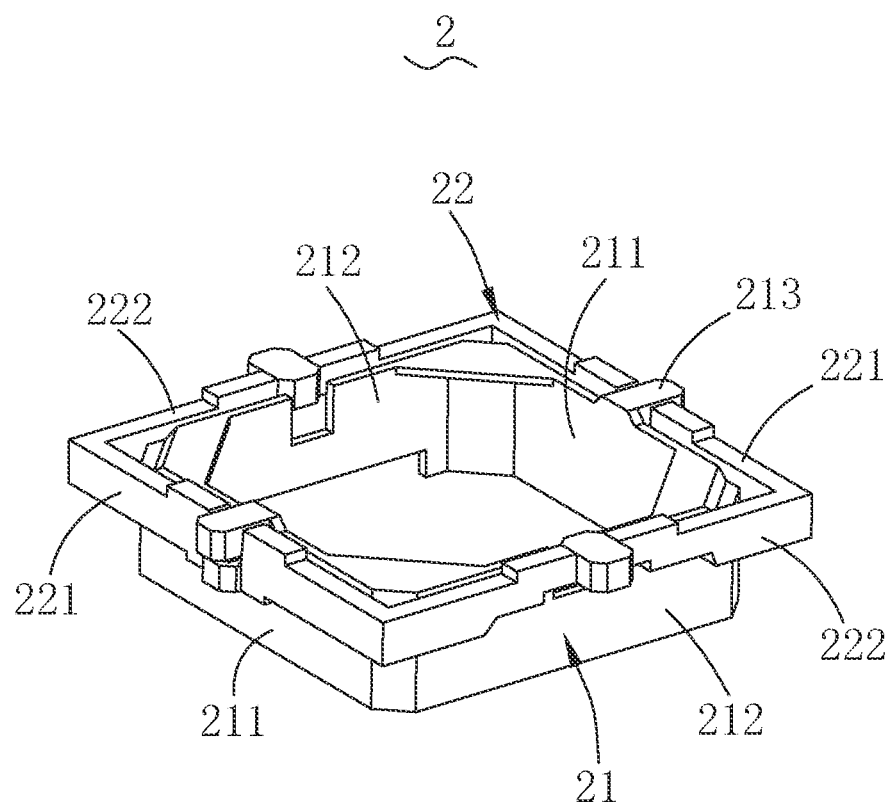
FIG. 9 is a schematic structural diagram of a bearing member according to an embodiment of the present disclosure.

Referring to FIG. 4, FIG. 5, and FIG. 9, the fixing frame 21 includes first fixing side plates 211 opposite to each other, and second fixing side plates 212 for connecting the first fixing side plates 211 and opposite to and spaced apart from each other. Each first fixing side plates 211 directly faces towards one of the first rotating side plates 221, and the first fixing side plates 211 is spaced apart from the first rotating side plate 221. Each second fixing side plates 212 directly faces towards one of the second rotating side plates 222, and the second fixing side plates 212 is spaced apart from the second rotating side plate 222. The two first wire-binding clamps 511 of one of the at least one first wire-binding clamp member 51 are respectively disposed at connecting portions where the first rotating side plate 221 is connected to the two second rotating side plates 222. The two second wire-binding clamps 521 of one of the at least one second wire-binding clamp member 52 are respectively disposed at connecting portions where the second fixing side plate 212 is connected to the two first fixing side plates 211. The two first wire-binding clamps 511 of the first wire-binding clamp member 51 are respectively disposed at the connecting portions where the first rotating side plate 221 is connected to the two second rotating side plates 222, so that it is convenient to electrically connect the two first shape memory alloy wires 41 on both sides of each of the second rotating side plate 222 to one first wire-binding clamp member 51. In an embodiment, the excessively long first shape memory alloy wires 41 are not necessary. The two second wire-binding clamps 521 of the second wire-binding clamp member 52 are respectively disposed at the connecting portions where the second fixing side plate 212 is connected to the two first fixing side plates 211, so that it is convenient to electrically connect the two second shape memory alloy wires 42 on both sides of each of the first rotating side plate 221 to one second wire-binding clamp member 52. In an embodiment, the excessively long second shape memory alloy wires 42 are not necessary. In another embodiment, the two first wire-binding clamps 511 of the first wire-binding clamp member 51 are not provided at the connecting portions where the first rotating side plate 221 is connected to the two second rotating side plates 222, or the two second wire-binding clamps 521 of the second wire-binding clamp member 52 are not provided at the connecting portions where the second fixing side plate 212 is connected to the two first fixing side plates 211. For example, the two first wire-binding clamps 511 of the first wire-binding clamp member 51 are respectively located at any positions of the first rotating side plate 221, and the two second wire-binding clamps 521 of the second wire-binding clamp member 52 are respectively located at any positions of the second fixing side plate 212.

In some embodiments, two first wire-binding clamp members 51 and two second wire-binding clamp members 52 are provided. Each of the first rotating side plates 221 is provided with one of the two first wire-binding clamp members 51, and each of the second fixing side plates 212 is provided with one of the two second wire-binding clamp members 52. The base 1 is provided with two first conductive connecting portions 61 close to each of the first rotating side plates 221, respectively. The base 1 is provided with two second conductive connecting portions 62 close to each of the second rotating side plates 222. Each of the first shape memory alloy wires 41 is electrically connected to one second conductive connecting portion 62 and one first wire-binding clamp 511, and each of the second shape memory alloy wires 42 is electrically connected to one first conductive connecting portion 61 and one second wire-binding clamp 521. With such configuration, each of the first rotating side plates 221 is provided with two of the second shape memory alloy wires 42 on one side thereof, and each of the second rotating side plates 222 is provided with two of the first shape memory alloy wires 41 on one side thereof.

In an embodiment, two second shape memory alloy wires 42 disposed at a same side of a same first rotating side plate 221 cross each other, and two first shape memory alloy wires 41 disposed at a same side of a same second rotating side plate 222 cross each other. It can be understood that, in other embodiments, two second shape memory alloy wires 42 disposed at one side of a same first rotating side plate 221 do not cross each other, and two first shape memory alloy wires 41 disposed at one side of a same second rotating side plate 222 do not intersect each other. In another embodiment, two second shape memory alloy wires 42 disposed at one side of a same first rotating side plate 221 can cross each other, and two first shape memory alloy wires 41 disposed at one side of a same second rotating side plate 222 do not cross each other. In another embodiment, two second shape memory alloy wires 42 disposed at one side of a same first rotating side plate 221 do not cross each other, and two first shape memory alloy wires 41 disposed at one side of a same second rotating side plate 222 cross each other.

As shown in FIG. 4 and FIG. 5, a first connecting member 71 is provided between the fixing frame 21 and each of the first rotating side plates 221. The fixing frame 21 is mounted to the rotating frame 22 through the first connecting members 71, and is rotatable relative to the rotating frame 22 about the second direction Y. A second connecting member 72 is provided between the base 1 and each of the second rotating side plates 222. The rotating frame 22 is mounted to the base 1 through the second connecting members 72, and is rotatable relative to the base 1 about the first direction X. With this arrangement, the lens assembly 3 can rotate about the first direction X and the second direction Y.

Figure 10:
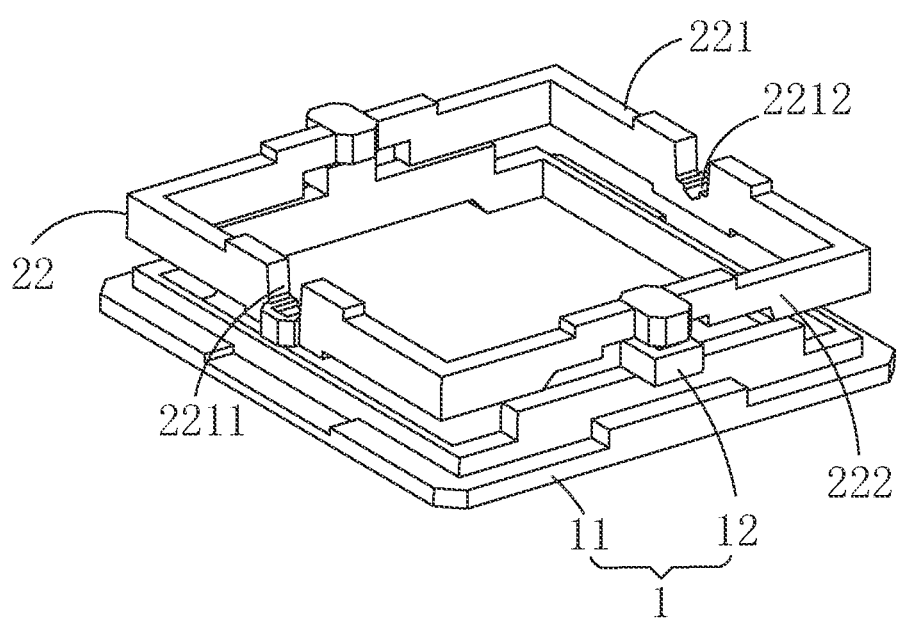
FIG. 10 is a schematic diagram showing a matching structure of a rotating frame and a base according to an embodiment of the present disclosure.
Figure 11:
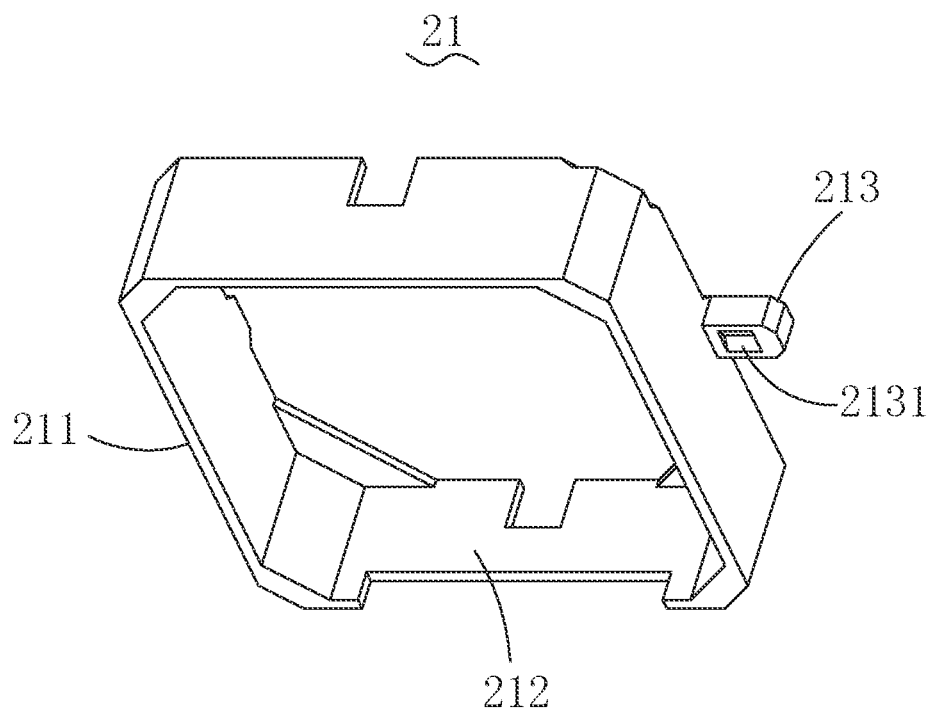
FIG. 11 is a schematic structural diagram of a fixing frame according to an embodiment of the present disclosure.
Figure 12:
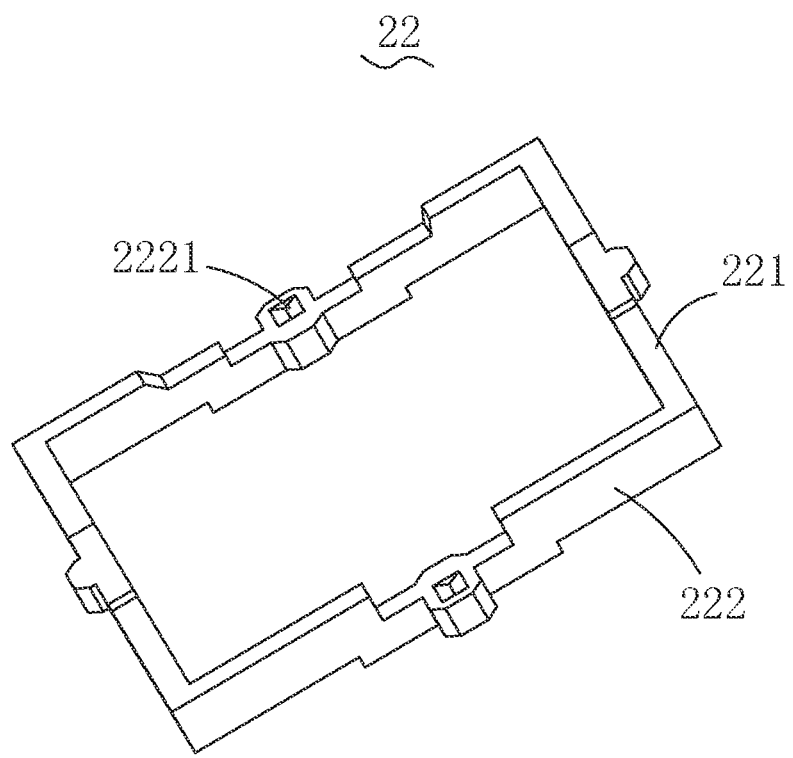
FIG. 12 is a schematic structural diagram of a rotating frame according to an embodiment of the present disclosure.

Referring to FIGS. 2, 5 and 10, the fixing frame 21 can further include fixing frame extending portions 213, each of which extends from one of the first fixing side plate 211 towards one of the first rotating side plates 221. The first connecting member 71 is disposed between the fixing frame extending portion 213 and the first rotating side plate 221. The base 1 includes base plates 11 and base extending portions 12, and each of the base extending portions 12 extends from a side of one of the base plate 11 corresponding to the second rotating side plate 222 towards the second rotating side plate 222. The second connecting member 72 is disposed between the base extending portion 12 and the second rotating side plate 222. In other embodiments, each of the first rotating side plates 221 is provided with an extending portion (not shown in the figures), and the first connecting member 71 is disposed between the extending portion and the first fixing side plate 211. In another embodiment, each of the second rotating side plates 222 is provided with an extending portion (not shown in the figures), and the second connecting member 72 is disposed between the base plate 11 and the extending portion on the corresponding second rotating side plate 222 of the second rotating frame 22.

In some embodiments, the first connecting members 71 include at least two first rolling balls 711, and each first rotating side plate 221 and each fixing frame extending portion 213 are provided with at least one of the at least two first rolling balls 711 therebetween. The second connecting members 72 include at least two second rolling balls 721, and each second rotating side plate 222 and each base extending portion 12 are provided with at least one of the at least two second rolling balls 721 therebetween. In an embodiment, each first rotating side plate 221 and each fixing frame extending portion 213 are provided with one first rolling ball 711 therebetween, and each second rotating side plate 222 and each base extending portion 12 are provided with one second rolling ball 721 therebetween.

In an embodiment, the first rolling ball 711 is arranged in a middle of the first rotating side plate 221, and the second rolling ball 721 is arranged in a middle of the second rotating side plate 222. In an embodiment, two first conductive connecting portions 61 disposed on a side of the same first rotating side plate 221 are symmetrically arranged with respect to the first ball 711, and two second conductive connecting portions 62 disposed on a side of the same second rotating side plate 222 are symmetrically arranged with respect to the second rolling ball 721. The lengths of the first shape memory alloy wires 41 are equal to the lengths of the second shape memory alloy wires 42. In this embodiment, the first shape memory alloy wires 41 and the second shape memory alloy wires 42 are arranged in a manner that a rotation center of the lens assembly 3 is disposed at the center of the lens assembly 3 and the bearing member 2 is driven by the shape memory alloy wire assembly 4 to rotate about a rotation point, which is optimized. When two first shape memory alloy wires 41 connecting to the same first wire-binding clamp member 51 or two second shape memory alloy wires 42 connecting to the same second wire-binding clamp member 52 are energized to contract, the lens assembly 3 rotates about the rotation center, which increases the rotation angle of the lens assembly 3.

Referring to FIGS. 5, 6 and 9 to 12, each of the first rotating side plates 221 is provided with a clamping portion 2211 recessed from a side of the first rotating side plate 221 close to the fixing frame extending portion 213 towards a direction away from the fixing frame extending portion 213. The first connecting member 71 is accommodated in the clamping portion 2211, and the fixing frame extending portion 213 is fitted with the clamping portion 2211 through the first connecting member 71. The clamping portion 2211 is recessed away from the fixing frame extending portion 213 to form a first recess 2212. A side of the fixing frame extending portion 213 close to the rotating frame 22 is recessed away from the rotating frame 22 to form a second recess 2131. The first recess 2212 is oppositely fitted to the second recess 2131 to form a first receiving space, and the first connecting member 71 is accommodated in the first receiving space. A side of the second rotating side plate 222 close to the base extending portion 12 is recessed away from the base extending portion 12 to form a third recess 2221. A side of the base extending portion 12 close to the second rotating side plate 222 is recessed away from the second rotating side plate 222 to form a fourth recess 121. The third recess 2221 is oppositely fitted to the fourth recess 121 to form a second receiving space, and the second connecting member 72 is accommodated in the second receiving space.

In some embodiments, referring to FIG. 1 and FIG. 2, the lens module 100 can further include a circuit board 8. The first conductive connecting portions 61 and the second conductive connecting portions 62 are electrically connected to the circuit board 8.

In some embodiments, the lens module 100 further includes a shell 9 having a receiving cavity. The shell 9 includes an upper housing 91 and a lower housing 92 that form the receiving cavity. The base 1, the bearing member 2, and the shape memory alloy wire assembly 4 are disposed in the receiving cavity, and the shell 9 is configured to protect the base 1, the bearing member 2, and the shape memory alloy wire assembly 4.

The above description merely illustrates some embodiments of the present disclosure. It should be understood that those skilled in the art can make improvements without departing from the concept of the present disclosure, which are included within the scope of the present disclosure.

What is claimed is:
1. A lens module comprising:
 a base;
 a bearing member rotatably connected to the base;
 a lens assembly accommodated in the bearing member;
 a shape memory alloy wire assembly configured to drive the bearing member to move relative to the base;
 at least one first wire-binding clamp member; and
 at least one second wire-binding clamp member,
 wherein the bearing member comprises a fixing frame and a rotating frame sleeved on the fixing frame;
 wherein the shape memory alloy wire assembly comprises first shape memory alloy wires connected between the rotating frame and the base, and second shape memory alloy wires connected between the fixing frame and the base, wherein the first shape memory alloy wires are configured to drive the rotating frame to rotate relative to the base about a first direction, the second shape memory alloy wires are configured to drive the fixing frame to rotate relative to the rotating frame about a second direction perpendicular to the first direction, and both the first direction and the second direction are perpendicular to an optical axis of the lens assembly;
 wherein the rotating frame comprises first rotating side plates opposite to and spaced apart from each other, and second rotating side plates connected to the first rotating side plates and opposite to and spaced apart from each other;
 wherein the at least one first wire-binding clamp member is fixed to at least one of the first rotating side plates, and the at least one second wire-binding clamp member is fixed to a side of the fixing frame close to at least one of the second rotating side plates;

wherein each of the at least one first wire-binding clamp member is connected to two first shape memory alloy wires of the first shape memory alloy wires respectively located at two sides of each of the second rotating side plates, and the two first shape memory alloy wires are configured to drive the rotating frame to rotate about the first direction when the two first shape memory alloy wires are energized; and wherein each of the at least one second wire-binding clamp member is connected to two second shape memory alloy wires of the second shape memory alloy wires respectively located at two sides of each of the first rotating side plates, and the two second shape memory alloy wires are configured to drive the fixing frame to rotate about the second direction when the two second shape memory alloy wires are energized.

2. The lens module as described in claim 1, wherein the rotating frame has a rectangular structure, the first direction is parallel to a direction of a line that connects middle portions of two opposite second rotating side plates of the second rotating side plates, and the second direction is parallel to a direction of a line that connects middle portions of two opposite first rotating side plates of the first rotating side plates.

3. The lens module as described in claim 2, wherein each of the at least one first wire-binding clamp member comprises two first wire-binding clamps and a first conductive sheet electrically connecting the two first wire-binding clamps, wherein each of the two first wire-binding clamps is electrically connected to one of the two first shape memory alloy wires that is located at a side of one of the second rotating side plates.

4. The lens module as described in claim 3, wherein each of the at least one second wire-binding clamp member comprises two second wire-binding clamps and a second conductive sheet electrically connecting the two second wire-binding clamps, wherein each of the two second wire-binding clamps is electrically connected to one of the two second shape memory alloy wires that is located at a side of one of the first rotating side plates.

5. The lens module as described in claim 4, wherein the fixing frame comprises first fixing side plates opposite to each other, and second fixing side plates configured to connect the first fixing side plates and opposite to and spaced apart from each other;

one first fixing side plate of the first fixing side plates directly faces towards and is spaced apart from one of the first rotating side plates, and one of the second fixing side plates directly faces towards and is spaced apart from one of the second rotating side plates;

the two first wire-binding clamps of one of the at least one first wire-binding clamp member are respectively disposed at connecting portions where one first rotating side plate of the first rotating side plates is connected to two of the second rotating side plates adjacent to the one first rotating side plate; and the two second wire-binding clamps of one of the at least one second wire-binding clamp member are respectively disposed at connecting portions where one of the second fixing side plates are connected to two of the first fixing side plates.

6. The lens module as described in claim 5, wherein the at least one first wire-binding clamp member comprises two first wire-binding clamp members, the at least one second wire-binding clamp member comprises two second wire-binding clamp members, each of the first rotating side plates is provided with one of the two first wire-binding clamps, and each of the second fixing side plates is provided with one of the two second wire-binding clamps;

two first conductive connecting portions are provided on portions of the base close to each of the first rotating side plates, respectively, and two second conductive connecting portions are provided on portions of the base close to each of the second rotating side plates, respectively; and each of the first shape memory alloy wires is electrically connected to one of the two second conductive connecting portions and one of the two first wire-binding clamps, and each of the second shape memory alloy wires is electrically connected to one of the two first conductive connecting portions and one of the two second wire-binding clamps.

7. The lens module as described in claim 6, wherein two of the second shape memory alloy wires disposed at a same side of one of the first rotating side plates cross each other, and two of the first shape memory alloy wires disposed at a same side of one of the second rotating side plates cross each other.

8. The lens module as described in claim 4, wherein the first conductive sheet is embedded in one of the first rotating side plates, and/or the second conductive sheet is embedded in the fixing frame.

9. The lens module as described in claim 8, wherein the fixing frame comprises first fixing side plates opposite to each other, and second fixing side plates configured to connect the first fixing side plates and opposite to and spaced apart from each other;

one first fixing side plate of the first fixing side plates directly faces towards and is spaced apart from one of the first rotating side plates, and one of the second fixing side plates directly faces towards and is spaced apart from one of the second rotating side plates;

the two first wire-binding clamps of one of the at least one first wire-binding clamp member are respectively disposed at connecting portions where one first rotating side plate of the first rotating side plates is connected to two of the second rotating side plates adjacent to the one first rotating side plate; and the two second wire-binding clamps of one of the at least one second wire-binding clamp member are respectively disposed at connecting portions where one of the second fixing side plates are connected to two of the first fixing side plates.

10. The lens module as described in claim 9, wherein a first connecting member is provided between the fixing frame and each of the first rotating side plates, and the fixing frame is mounted to the rotating frame through the first connecting member and is rotatable relative to the rotating frame about the second direction; and a second connecting member is provided between the base and each of the second rotating side plates, and the rotating frame is mounted to the base through the second connecting member and is rotatable relative to the base about the first direction.

11. The lens module as described in claim 10, wherein the fixing frame further comprises fixing frame extending portions, each of which extends from one of the first fixing side plates towards one of the first rotating side plates;

the first connecting member is provided between one of the fixing frame extending portions and one of the first rotating side plates; and the base comprises a base plate and base extending portions respectively extending from sides of the base plate corresponding to the second rotating side plates towards the second rotating side plates, and the second connecting member is disposed between one of the base extending portions and one of the second rotating side plates.

12. The lens module as described in claim 11, wherein the first connecting member comprises at least two first rolling balls, wherein at least one of the at least two first rolling balls is provided between each of the first rotating side plates and one of the fixing frame extending portions; and the second connecting member comprises at least two second rolling balls, wherein at least one of the at least two second rolling balls is provided between each of the second rotating side plates and one of the base extending portions.

13. The lens module as described in claim 12, wherein each of the at least two first rolling balls is disposed at a middle of one of the first rotating side plates, and each of the at least two second rolling balls is disposed at a middle of one of the second rotating side plates.

14. The lens module as described in claim 11, wherein each of the first rotating side plates is provided with a clamping portion that is recessed from a side of the first rotating side plate close to one fixing frame extending portion of the fixing frame extending portions towards a direction away from the fixing frame extending portion, the first connecting member is accommodated in the clamping portion, and the one fixing frame extending portion is fitted to the clamping portion through the first connecting member.

15. The lens module as described in claim 14, wherein the clamping portion is recessed away from the one fixing frame extending portion to form a first recess, and a side of the one fixing frame extending portion close to the rotating frame is recessed away from the rotating frame to form a second recess; and the first recess and the second recess are oppositely fitted to each other to form a first receiving space where the first connecting member is accommodated.

16. The lens module as described in claim 11, wherein a side of one of the second rotating side plates close to one base extending portion of the base extending portions is recessed away from the one base extending portion to form a third recess, and a side of the one base extending portion close to one second rotating side plate of the second rotating side plates is recessed away from the one second rotating side plate to form a fourth recess; and the third recess and the fourth recess are oppositely fitted to form a second receiving space where the second connecting member is accommodated.

17. The lens module as described in claim 9, wherein the at least one first wire-binding clamp member comprises two first wire-binding clamp members, the at least one second wire-binding clamp member comprises two second wire-binding clamp members, each of the first rotating side plates is provided with one of the two first wire-binding clamps, and each of the second fixing side plates is provided with one of the two second wire-binding clamps;

two first conductive connecting portions are provided on portions of the base close to each of the first rotating side plates, respectively, and two second conductive connecting portions are provided on portions of the base close to each of the second rotating side plates, respectively; and each of the first shape memory alloy wires is electrically connected to one of the two second conductive connecting portions and one of the two first wire-binding clamps, and each of the second shape memory alloy wires is electrically connected to one of the two first conductive connecting portions and one of the two second wire-binding clamps.

18. The lens module as described in claim 17, wherein two of the second shape memory alloy wires disposed at a same side of one of the first rotating side plates cross each other, and two of the first shape memory alloy wires disposed at a same side of one of the second rotating side plates cross each other.

* * * * *